(12) United States Patent
Kurogi et al.

(10) Patent No.: US 12,730,513 B2
(45) Date of Patent: Sep. 8, 2026

(54) TACTILE FEEDBACK APPARATUS

(71) Applicants: TOYODA GOSEI CO., LTD., Kiyosu (JP); KEIO UNIVERSITY, Tokyo (JP)

(72) Inventors: Tadatoshi Kurogi, Kiyosu (JP); Takeshi Fujiwara, Kiyosu (JP); Yuji Yonehara, Kiyosu (JP); Kouta Minamizawa, Tokyo (JP); Taku Tanichi, Tokyo (JP)

(73) Assignees: Toyoda Gosei Co., Ltd., Kiyosu (JP); Keio University, Tokyo (JP)

( * ) Notice: Subject to any disclaimer, the term of this patent is extended or adjusted under 35 U.S.C. 154(b) by 90 days.

(21) Appl. No.: 18/689,290

(22) PCT Filed: Sep. 8, 2021

(86) PCT No.: PCT/JP2021/032955
§ 371 (c)(1),
(2) Date: Mar. 5, 2024

(87) PCT Pub. No.: WO2023/037431
PCT Pub. Date: Mar. 16, 2023

(65) Prior Publication Data
US 2025/0130642 A1 Apr. 24, 2025

(51) Int. Cl.
*G06F 3/01* (2006.01)

(52) U.S. Cl.
CPC .................................... *G06F 3/016* (2013.01)

(58) Field of Classification Search
CPC ............. G06F 3/016; G06F 3/014; G06F 3/01
See application file for complete search history.

(56) References Cited

U.S. PATENT DOCUMENTS

2008/0024459 A1* 1/2008 Poupyrev .............. G06F 3/0488 345/173
2008/0122315 A1* 5/2008 Maruyama .............. G06F 3/016 310/314
(Continued)

FOREIGN PATENT DOCUMENTS

JP 2008-123453 A 5/2008
JP 4769342 B2 9/2011
(Continued)

OTHER PUBLICATIONS

International Search Report (ISR) (PCT Form PCT/ISA/210), in PCT/JP2021/032955, dated Nov. 22, 2021 (English and Japanese versions).

*Primary Examiner* — Davetta W Goins
(74) *Attorney, Agent, or Firm* — McGinn IP Law Group, PLLC

(57) ABSTRACT

A tactile feedback apparatus includes a pressable portion on which a pressing action is performed by a pressing portion, a detection unit that detects an external force acting on the pressable portion or detects a position of the pressing portion with respect to the pressable portion, a vibration actuator that applies vibration to the pressing portion, a storage unit that stores waveform information for driving the vibration actuator so as to provide the pressing portion with a specific tactile sensation, and a control unit that causes the vibration actuator to vibrate based on the waveform information at a specific point in time in the pressing action. The specific point in time is based on the external force or the position detected by the detection unit.

19 Claims, 5 Drawing Sheets

(56) References Cited

U.S. PATENT DOCUMENTS

| | | | | |
|---|---|---|---|---|
| 2009/0160813 | A1* | 6/2009 | Takashima | G06F 3/016<br>345/173 |
| 2011/0248929 | A1* | 10/2011 | Tong | G06F 3/016<br>345/173 |
| 2011/0248930 | A1* | 10/2011 | Kwok | G06F 3/0488<br>345/173 |
| 2011/0248948 | A1* | 10/2011 | Griffin | G06F 3/0488<br>345/174 |
| 2011/0254671 | A1* | 10/2011 | Okimoto | G06F 3/016<br>340/407.1 |
| 2013/0093703 | A1* | 4/2013 | Yang | G06F 3/016<br>345/173 |
| 2016/0018893 | A1* | 1/2016 | Choi | G06F 3/016<br>345/177 |
| 2020/0257364 | A1* | 8/2020 | Strandberg | B60K 35/81 |

FOREIGN PATENT DOCUMENTS

| | | | |
|---|---|---|---|
| JP | 2014-081716 | A | 5/2014 |
| WO | WO 2020/241655 | A1 | 12/2020 |

* cited by examiner

Positional relationship between finger and pressable portion
Pressure Sensation
Stimulus based on Vibration
Combined
t0
t1
t2
t3
t4
t5
Time Positional relationship between finger and pressable portion
Pressure Sensation
Stimulus based on Vibration
Combined
t0
t1
t2
t3
t4
t5
Time

TACTILE FEEDBACK APPARATUS

TECHNICAL FIELD

The present invention relates to a tactile feedback apparatus.

BACKGROUND ART

Research is being conducted to apply tactile feedback apparatuses, which provide users with tactile sensations, in various technological fields such as interactive computer applications, remote robotic engineering, entertainment, and medicine. A tactile feedback apparatus enables users to perceive intended tactile sensations through application of stimuli such as vibrations.

Patent Literature 1 discloses a human skin-like sensation providing device that provides a user with a sensation similar to human skin. The human skin-like sensation providing device of Patent Literature 1 includes a human skin-like gel provided on a propagation member, through which vibration propagates, and a vibration output unit, which applies vibration to the human skin-like gel. The human skin-like sensation providing device of Patent Literature 1 applies vibration from the vibration output unit to a finger via a human skin-like gel when a sliding action of touching and sliding on the surface of the human skin-like gel is performed with the finger. This provides the sliding finger with a tactile sensation of an intended skin condition, such as smooth or rough skin.

CITATION LIST

Patent Literature

Patent Literature 1: International Publication No. 2020-241655

SUMMARY OF INVENTION

Technical Problem

There is a demand for tactile feedback apparatuses to reproduce a more diverse range of tactile sensations. The tactile feedback apparatus of Patent Literature 1 cannot reproduce tactile sensations other than tactile sensations related to surface roughness such as that of smooth skin and rough skin.

Solution to Problem

To achieve the foregoing objectives, a tactile feedback apparatus includes a pressable portion on which a pressing action is performed by a pressing portion, a detection unit that detects an external force acting on the pressable portion or detects a position of the pressing portion with respect to the pressable portion, a vibration actuator that applies vibration to the pressing portion, a storage unit that stores waveform information for driving the vibration actuator so as to provide the pressing portion with a specific tactile sensation, and a control unit that causes the vibration actuator to vibrate based on the waveform information at a specific point in time in the pressing action. The specific point in time is based on the external force or the position detected by the detection unit.

With the above-described configuration, a stimulus of vibration of the vibration actuator is applied to the pressing portion at the specific point in time in a pressing action of pressing the pressable portion. This provides the user with a tactile sensation that cannot be reproduced in the related art, through the pressing portion.

In one aspect of the above-described tactile feedback apparatus, the vibration actuator is capable of moving in accordance with the pressing portion that is performing the pressing action.

With the above-described configuration, a stimulus of vibration of the vibration actuator is reliably applied to the pressing portion at various points in time in a pressing action.

In one aspect of the above-described tactile feedback apparatus, the pressing portion is a part of a human body, and the vibration actuator is attached to the pressing portion.

The above-described configuration allows the vibration actuator and the pressing portion to be brought into close contact with each other. Thus, even if the vibration of the vibration actuator is relatively weak, the vibration is transmitted to the pressing portion. This widens the range of the tactile sensations that can be provided based on vibrations of the vibration actuator.

In one aspect of the above-described tactile feedback apparatus, the control unit causes the vibration actuator to vibrate during a period in which the external force acting on the pressable portion is increasing.

The above-described configuration provides the user with a tactile sensation that feels harder than the actual tactile sensation of the pressable portion, or provides the user with a granular texture sensation that is distinct from the actual tactile sensation of the pressable portion.

In one aspect of the above-described tactile feedback apparatus, the control unit causes the vibration actuator to vibrate during a period obtained by combining a period during which the external force acting on the pressable portion from the pressing portion is decreasing and a fixed period from a point in time at which the pressing portion is separated from the pressable portion.

The above-described configuration provides the user with a sticky sensation, which is not present in the actual tactile sensation of the pressable portion.

In one aspect of the above-described tactile feedback apparatus, the control unit includes a tactile sensation setting unit that adjusts vibration of the vibration actuator based on the waveform information.

The above-described configuration provides the user with a tactile sensation that is close to an intended tactile sensation.

In one aspect of the above-described tactile feedback apparatus, the waveform information is waveform information for driving the vibration actuator so as to provide the pressing portion with a tactile sensation simulating human skin.

To achieve the foregoing objectives, a tactile feedback apparatus includes a detection unit that is attached to a pressing portion and detects an external force acting on a pressable portion on which a pressing action is performed by the pressing portion, a vibration actuator that applies vibration to the pressing portion, a storage unit that stores waveform information for driving the vibration actuator so as to provide the pressing portion with a specific tactile sensation, and a control unit that causes the vibration actuator to vibrate based on the waveform information at a specific point in time in the pressing action.

The specific point in time is based on the external force detected by the detection unit.

DESCRIPTION OF EMBODIMENTS

A tactile feedback apparatus according to one embodiment will now be described.

Figure 1:
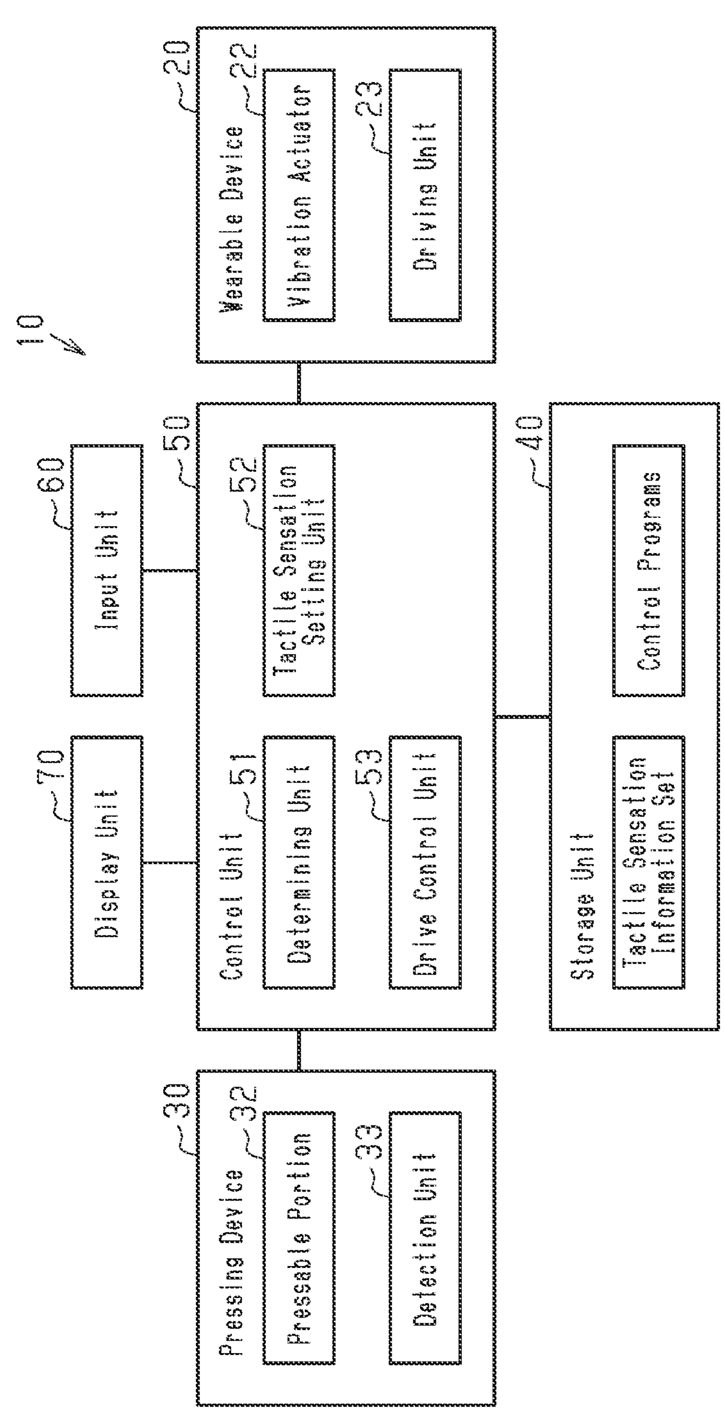
FIG. 1 is a block diagram of a tactile feedback apparatus.

As illustrated in FIG. 1, a tactile feedback apparatus 10 includes a wearable device 20, a pressing device 30, a storage unit 40, a control unit 50, an input unit 60, and a display unit 70. The tactile feedback apparatus 10 is composed of, for example, the wearable device 20, the pressing device 30, and a computer that includes the storage unit 40, the control unit 50, the input unit 60, and the display unit 70.

Wearable Device

Figure 2:
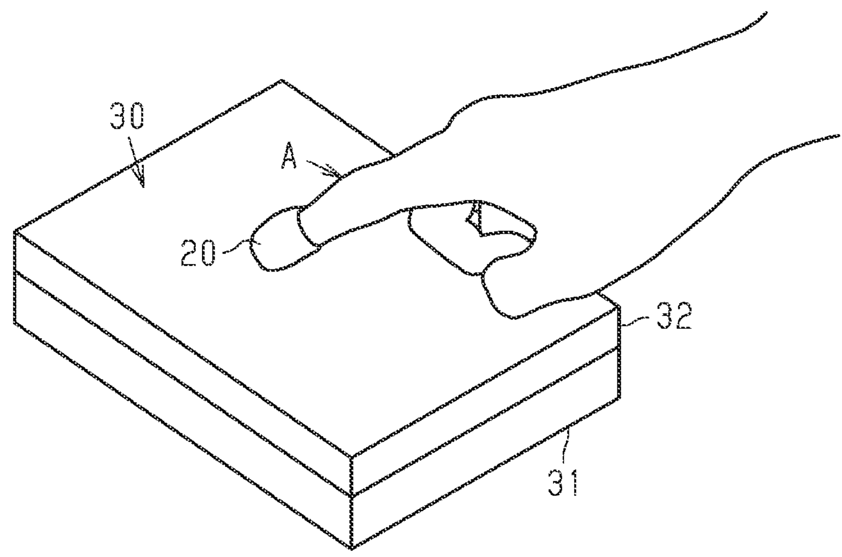
FIG. 2 is a perspective view of a wearable device and a pressing device.
Figure 3:
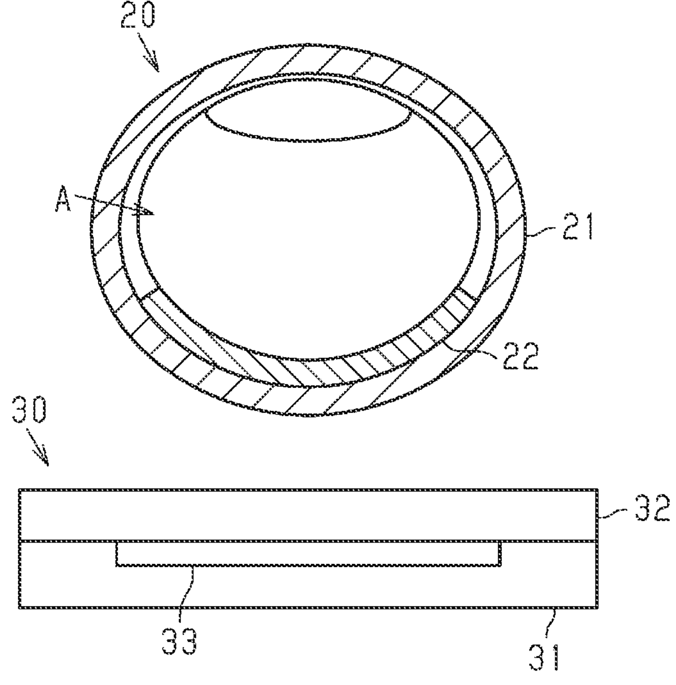
FIG. 3 is a cross-sectional view of the wearable device and the pressing device.

As shown in FIGS. 1 to 3, the wearable device 20 is a tactile feedback device that is attached to a fingertip of a user's finger A. The wearable device 20 includes a band-shaped base 21, which is attachable to the user's finger A by being wound around the finger A. The base 21 is made of a soft material that can be curved, and expand or contract in any planar direction. The soft materials used for the base 21 include an elastomer such as silicone and urethane, and a stretch fabric.

A vibration actuator 22 is disposed on the inner surface of the base 21. The vibration actuator 22 is, for example, a flexible sheet-shaped dielectric elastomer actuator (DEA). Although not illustrated, a holding portion for holding the base 21 in a state of being wound around the finger A is provided on the inner surface or the outer surface of the base 21. The holding portion is not particularly limited, and a typical configuration used for holding a band-shaped member such as a hook-and-loop fastener can be used.

The DEA is a multilayer structure including sheet-shaped dielectric layers each made of a dielectric elastomer, positive electrode layers, and negative electrode layers. One of the positive electrode layers and one of the negative electrode layers are arranged on opposite sides of corresponding one of the dielectric layers in the thickness direction. An insulating layer is laminated on the outermost layer of the DEA. In the DEA, when direct-current voltage is applied across the positive electrode and the negative electrode, the dielectric layer is deformed so as to be compressed in the thickness direction and to be extended in the planar direction of the DEA, which is a direction along the plane of the dielectric layer, in accordance with the magnitude of the applied voltage. The DEA causes the user to recognize vibration or the like based on expansion and contraction of the DEA as a tactile sensation.

The dielectric elastomer of the dielectric layer is not particularly limited, and a dielectric elastomer used in a typical DEA can be used. The dielectric elastomer may be, for example, crosslinked polyrotaxane, silicone elastomer, acrylic elastomer, or urethane elastomer. Further, one of these types of dielectric elastomer may be used alone, or two or more of these may be used in combination. The thickness of the dielectric layers is, for example, 20 to 200 μm.

The materials for the positive electrode layer and the negative electrode layer include, for example, conductive elastomer, carbon nanotubes, Ketjen black (registered trademark), and vapor-deposited metal films. The conductive elastomer includes, for example, a conductive elastomer that contains an insulating polymer and a conductive filler.

The insulating polymer includes, for example, a cross-linked polyrotaxane, silicone elastomer, acrylic elastomer, or urethane elastomer. One of these types of insulating polymer may be used alone, or two or more of these may be used in combination. The conductive filler may be, for example, carbon nanotubes, Ketjen black (registered trademark), carbon black, or metal particles of copper, silver, or the like. One of these types of conductive filler may be used alone, or two or more of these may be used in combination. The thicknesses of the positive electrode and the negative electrode are, for example, 1 to 100 μm.

The insulating elastomer forming the insulating layer is not particularly limited, and may be a typical insulating elastomer that is used for the insulating portion of a typical DEA. The insulating elastomer may be, for example, cross-linked polyrotaxane, silicone elastomer, acrylic elastomer, and urethane elastomer. Further, one of these types of insulating elastomer may be used alone, or two or more of these may be used in combination. The thickness of the insulating layer is, for example, 10 to 100 μm. Furthermore, the overall thickness of the DEA, from the perspective of ensuring flexibility and strength, is preferably, for example, 0.3 to 3 mm.

As shown in FIG. 1, the wearable device 20 includes a driving unit 23 that applies a voltage from a power source (not shown) such as a battery across two electrodes, which are the positive electrode and the negative electrode of the vibration actuator 22.

Pressing Device

As shown in FIGS. 1 to 3, the pressing device 30 includes a base 31. The base 31 is a member made of a hard material such as an acrylic plate. A pressable portion 32 is disposed on the upper surface of the base 31.

The pressable portion 32 is a sheet-shaped elastic body that is compressible in the thickness direction. The thickness of the pressable portion 32 is, for example, 3 to 15 μm. As a material forming the pressable portion 32, for example, an elastic material such as a super soft urethane plastic is used. Specific examples of the pressable portion 32 include a skin model simulating human skin, such as Bioskin (registered trademark) manufactured by Beaulax Co., Ltd.

A detection unit 33 is provided between the base 31 and the pressable portion 32 in the pressing device 30 to detect an external force acting on the pressable portion 32. The detection unit 33 is, for example, a strain sensor or a pressure sensor.

Storage Unit

As shown in FIG. 1, the storage unit 40 stores multiple types of tactile sensation information sets and control programs. The storage unit 40 is, for example, a nonvolatile memory.

Each tactile sensation information set includes preset waveform information and timing information. The waveform information is a voltage waveform for driving the vibration actuator so as to provide the user with a specific tactile sensation. The timing information is information relating to the timing at which the vibration actuator 22 is driven based on the waveform information. The waveform information and the timing information are set for each tactile sensation information set in accordance with the type of tactile sensation to be provided. In the present embodiment, the tactile sensation information sets include a first tactile sensation information set, a second tactile sensation information set, a third tactile sensation information set, and a fourth tactile sensation information set.

The first tactile sensation information set is configured to provide the user with a hard tactile sensation, as if the user had clicked on a hard substance, when the user presses and releases the pressable portion 32 of the pressing device 30 (hereinafter, referred to as a pressing action). In the present embodiment, the waveform information included in the first tactile sensation information set represents rectangular waves of 200 Hz. The timing information included in the first tactile sensation information set represents a fixed period immediately after the external force starts to act on the pressable portion 32. The fixed period is, for example, 0.05 to 50 milliseconds from the point in time at which the external force starts to act on the pressable portion 32.

When providing the user with hard tactile sensation during a pressing action, the vibration actuator 22 is caused to vibrate at 1 to 1000 Hz during a period in which the external force acting on the pressable portion increases. As the frequency of the vibration of the vibration actuator increases, a harder tactile sensation is provided to the user. In addition, if the vibration actuator 22 is caused to vibrate at an early timing in the period, the user is likely to feel that the pressable portion 32 is hard. If the vibration actuator 22 is caused to vibrate at a relatively late time point during the above period, the user perceives a tactile sensation as if the surface of the pressable portion 32 were soft, while the interior were hard.

The second tactile sensation information set is configured to provide the user with a granular texture sensation as if the user were pressing sand when the user performs a pressing action. In the present embodiment, the waveform information included in the second tactile sensation information set represents a waveform obtained by combining multiple sine waves. The timing information included in the second tactile sensation information set represents an entire period of time during which the external force acting on the pressable portion 32 is increasing.

When providing the user with a granular texture sensation during a pressing action, the vibration actuator 22 is caused to vibrate such that the vibration is a combination of multiple sine waves. The sine waves to be combined are, for example, sine waves having different frequencies and/or different amplitudes. The frequencies of the combined sine waves are, for example, 10 to 1000 Hz.

As the frequency of the vibration of the vibration actuator 22 increases, a finer granular texture sensation is provided to the user.

The third tactile sensation information set is configured to provide the user with a sticky sensation of moist human skin when the user performs a pressing action. In the present embodiment, the waveform information included in the third tactile sensation information set represents a sine wave of 30 Hz. The timing information included in the third tactile sensation information set represents a fixed period immediately after the external force acting on the pressable portion 32 disappears.

In addition, when providing the user with a sticky sensation of moist human skin during a pressing action, the vibration actuator 22 is caused to vibrate such that the frequency is in a range of 1 to 1000 Hz within a period obtained by combining a period during which the external force acting on the pressable portion 32 is decreasing and a fixed period from the point in time at which the external force acting on the pressable portion 32 disappears. The higher the frequency band of the vibration of the vibration actuator 22, the more increased the firmness of the skin simulated by the sticky sensation becomes. The fixed period is, for example, within 10 milliseconds from the point in time at which the external force disappears.

The fourth tactile sensation information set is configured to provide the user with a sticky sensation like that of the sticky side of adhesive tape. In the present embodiment, the waveform information included in the fourth tactile sensation information set represents a waveform obtained by combining multiple sine waves. The timing information included in the fourth tactile sensation information set represents a fixed period immediately after the external force acting on the pressable portion 32 disappears.

In addition, when providing the user with a sticky sensation like that of a sticky object at the time of a pressing action, the vibration actuator 22 is caused to vibrate such that the vibration is a combination of multiple sine waves within a period obtained by combining a period during which the external force acting on the pressable portion 32 is decreasing and a fixed period from the point in time at which the external force acting on the pressable portion 32 disappears. The sine waves to be combined are, for example, sine waves having different frequencies and/or different amplitudes. The frequencies of the combined sine waves are, for example, 10 to 1000 Hz. The more intense the vibration of the vibration actuator 22, the stickier the sensation provided to the user becomes. The fixed period is, for example, within 10 milliseconds from the point in time at which the external force disappears.

Control Unit

The control unit 50 includes a determining unit 51, a tactile sensation setting unit 52, and a drive control unit 53. The control unit 50 may be circuitry including: 1) one or more processors that operate according to a computer program (software); 2) one or more dedicated hardware circuits (application specific integrated circuits: ASIC) that execute at least part of various processes; or 3) a combination thereof. The processors include, for example, CPUs. Each of the processes described below is executed by the control unit 50 using control programs stored in the storage unit 40.

The determining unit 51 executes a process of determining, based on a detection result of the detection unit 33, whether an external force is acting on the pressable portion 32, and whether the external force acting on the pressable portion 32 is increasing, decreasing, or maintained.

The tactile sensation setting unit 52 executes a process of selecting one of the tactile sensation information sets based on a user's operation.

The drive control unit 53 executes a process of causing the vibration actuator 22 to vibrate based on the determination result of the determining unit 51 and the tactile sensation information set that is set by the tactile sensation setting unit 52. Specifically, the drive control unit 53 executes a process of controlling the driving unit 23 such that a voltage having a waveform represented by the waveform information included in the tactile sensation information set is applied to the vibration actuator 22 at a point in time based on the timing information included in the tactile sensation information set.

In addition, based on the operation of the user, the tactile sensation setting unit 52 adjusts the vibration of the vibration actuator 22 based on the tactile sensation information set. When the process of driving the vibration actuator 22 is executed, the tactile sensation setting unit 52 generates an editable tactile sensation information set, which is obtained by duplicating the tactile sensation information set used for driving the vibration actuator 22. The tactile sensation setting unit 52 adjusts the editable tactile sensation information set based on the user's operation on the input unit 60. If a pressing action is performed during the adjustment of the tactile sensation information set, that is, in a state in which the editable tactile sensation information set is generated, the drive control unit 53 controls the driving unit 23 using the editable tactile sensation information so as to drive the vibration actuator 22.

Input Unit and Display Unit

The input unit 60 receives operation instructions and the like from the user. Examples of the input unit 60 include a keyboard, a touch screen, and a mouse.

Figure 4:
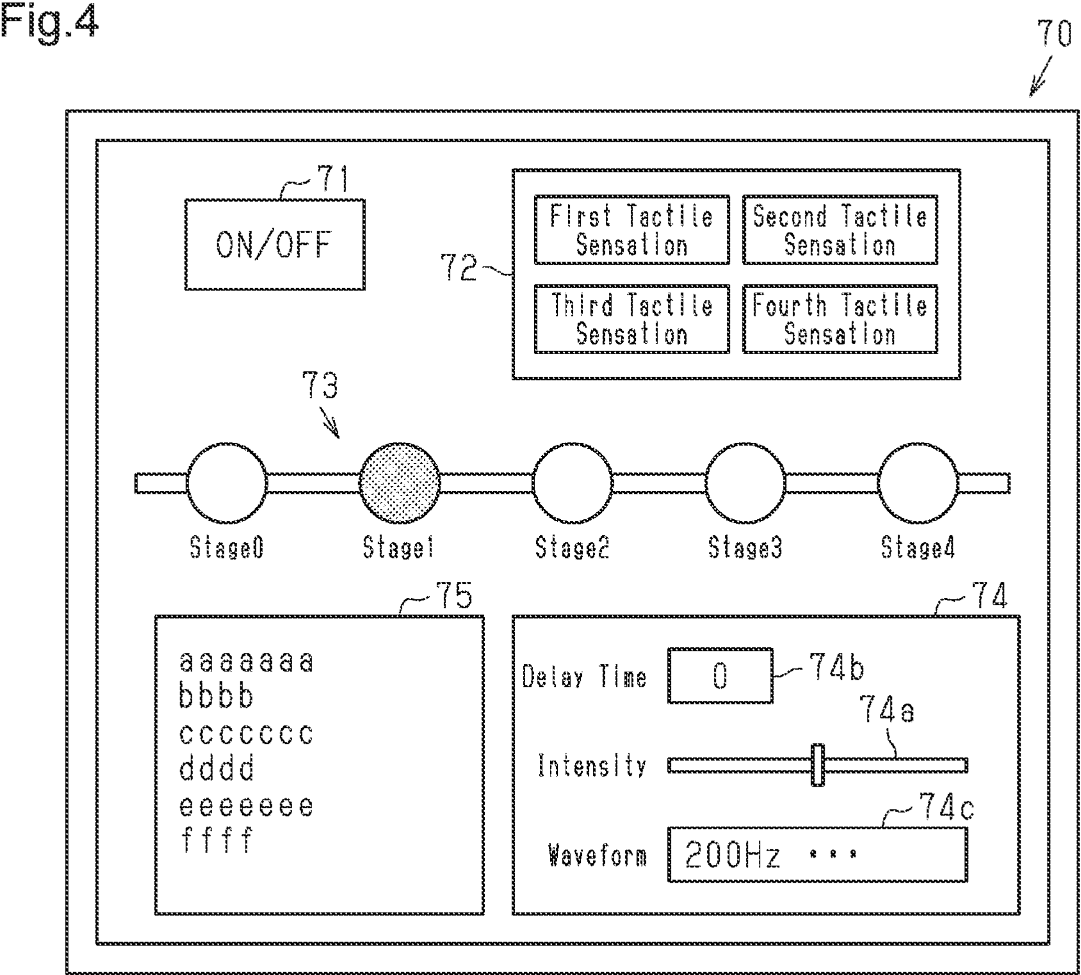
FIG. 4 is an explanatory diagram of a display screen of a display unit.

The display unit 70 is, for example, a liquid crystal display or an organic EL display. The display unit 70 shows a settings screen for setting the tactile sensation to be provided by the tactile feedback apparatus 10. FIG. 4 shows an example of the settings screen.

As shown in FIG. 4, an output button 71 for switching ON/OFF of the tactile feedback is displayed in the upper left portion of the display screen. In the upper right portion of the display screen, multiple call buttons 72 for calling up the tactile sensation information set used for driving the vibration actuator 22 are displayed. The call buttons 72 are associated with the first to fourth tactile sensation information sets, respectively.

At the center of the display screen, a stage showing area 73, which indicates the stage of a pressing action, is displayed. The stage showing area 73 displays the flow of a pressing action divided into stages 0 to 4, and indicates which of stages 0 to 4 is the current state.

Stage 0 is a state in which no external force is applied to the pressable portion 32, that is, a state before the pressable portion 32 is pressed. Stage 1 is a state in which the external force acting on the pressable portion 32 is increasing. Stage 2 is a state in which the external force acting on the pressable portion 32 is held constant. Stage 3 is a state in which the external force acting on the pressable portion 32 is decreasing. Stage 4 is in a state in which the external force acting on the pressable portion 32 has become 0, that is, a state in which the pressing on the pressable portion 32 is discontinued.

An adjustment area 74 for adjusting the vibration of the vibration actuator 22 based on the tactile sensation information set is displayed in the lower right portion of the display screen. The adjustment area 74 displays a slider 74*a*, a time adjustment section 74*b*, and a waveform adjustment section 74*c*. When the slider 74*a* is operated, the intensity of the provided tactile sensation changes. The time adjustment section 74*b* displays a delay time of the vibration of the vibration actuator 22. When the delay time is changed, the time at which the vibration actuator 22 vibrates is changed. The waveform adjustment section 74*c* displays details such as the frequency represented by the currently selected waveform information. When the details of the waveform information are changed, the vibration pattern of the vibration actuator 22 is changed.

Debug information is displayed in a debug display section 75 in the lower left portion of the display screen.

When the display content of the display unit 70 is changed by operating the input unit 60, the tactile sensation setting unit 52 sets and adjusts the tactile sensation provided by the tactile feedback apparatus 10.

Next, an example of a method of providing a tactile sensation using the tactile feedback apparatus 10 according to the present embodiment will be described. In the following description, an operation on the display screen of the display unit 70 is performed via the input unit 60.

First, as a preparation step, the user operates one of the call buttons 72 in a standby state, in which the output button 71 on the display screen of the display unit 70 is off, so as to select a tactile sensation to be provided from the first to fourth tactile sensations associated with the first to fourth tactile sensation information sets. At this time, the user adjusts the vibration of the vibration actuator 22 based on the selected tactile sensation information set by operating the adjustment area 74 as necessary. Thereafter, the user turns on the output button 71 to bring the tactile feedback apparatus 10 into the tactile feedback state. In addition, the user attaches the wearable device 20 onto the finger A so that the vibration actuator 22 is positioned on the pad of the finger A.

Next, the user performs a pressing action of pressing the pressable portion 32 of the pressing device 30 downward from above, using the pad of the finger A, to which the wearable device 20 is attached. In the present embodiment, the finger A corresponds to the pressing portion. The details of the pressing force, the pressing speed, the pressing time, and the like in the pressing action are not particularly limited. Examples of the pressing action include a pressing action shown in FIG. 5.

Figure 5:
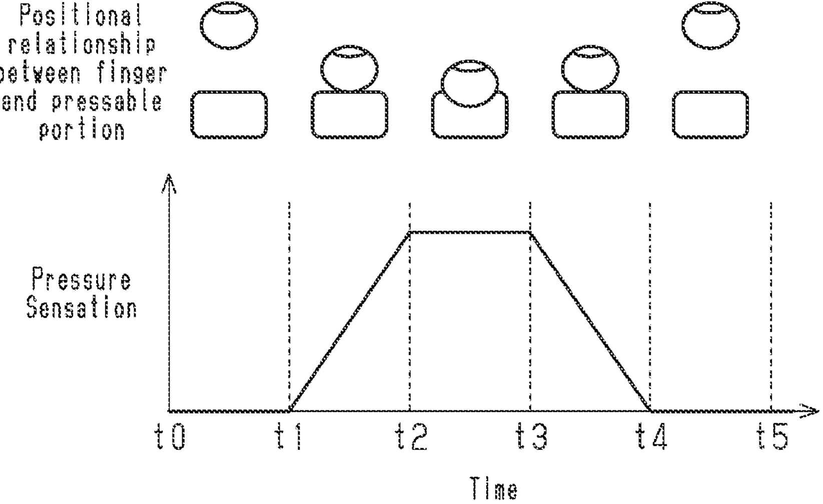
FIG. 5 is a timing diagram of a pressing action.

The pressing action illustrated in FIG. 5 is an action of pressing the finger A against the pressable portion 32 at a constant speed, then maintaining the state for a certain amount of time, and then lifting the finger A at a constant speed to separate the finger A from the pressable portion 32.

In the pressing action shown in FIG. 5, the period from t0 to t1 before the finger A performs a pressing action is the state of stage 0, in which no external force is being applied to the pressable portion 32. The period from t1 to t2, in which the finger A is pressed against the pressable portion 32 at a constant speed is a state of stage 1, in which the force acting on the pressable portion 32 is increasing. The period from t2 to t3, during which the pressed state is maintained, is the state of stage 2. The period from t3 to t4, in which the finger A is lifted at a constant speed and the finger A is in contact with the pressable portion 32, is the state of stage 3, in which the stress acting on the pressable portion 32 is decreasing. The period from t4 to t5 during which the finger A is lifted at a constant speed and after the finger A is separated from the pressable portion 32 is the state of stage 4, in which the external force acting on the pressable portion 32 has become 0.

When a pressing action is performed on the tactile feedback apparatus 10 in the tactile feedback state, the external force acting on the pressable portion 32 due to the pressing action is detected by the detection unit 33. Then, based on the detection result of the detection unit 33, the determining unit 51 determines whether the external force is acting on the pressable portion 32, and whether the external force acting on the pressable portion 32 is increasing, decreasing, or maintained. That is, it is determined which of the points in time to to t5 corresponds to the current moment.

The drive control unit 53 causes the vibration actuator 22 to vibrate based on the determination result of the determining unit 51 and the adjustment content adjusted by the set tactile sensation information set and the adjustment area 74. That is, based on the determination result of the determining unit 51, the drive control unit 53 applies, to the vibration actuator 22, a voltage having the waveform represented by the waveform information included in the tactile sensation information set at the point in time that is determined based on the timing information included in the tactile sensation information set. This causes the vibration actuator 22 to vibrate.

At the time of the pressing action, a reaction force from the pressable portion 32, which is deformed in accordance with the pressing action, is transmitted to the finger A, to which the wearable device 20 is attached. At a certain point in time, the finger A receives both the pressure sensation based on the reaction force transmitted from the pressable portion 32 and the stimulus based on the vibration of the vibration actuator 22. At this time, in the user's finger A, the pressure sensation transmitted from the pressable portion 32 and the stimulus based on the vibration of the vibration actuator 22 are combined, so that the user perceives the tactile sensation of the pressable portion 32 as a tactile sensation different from the actual tactile sensation. That is, an intended tactile sensation based on the stimulus from the vibration actuator 22 is provided to the user.

Figures 6, 7:
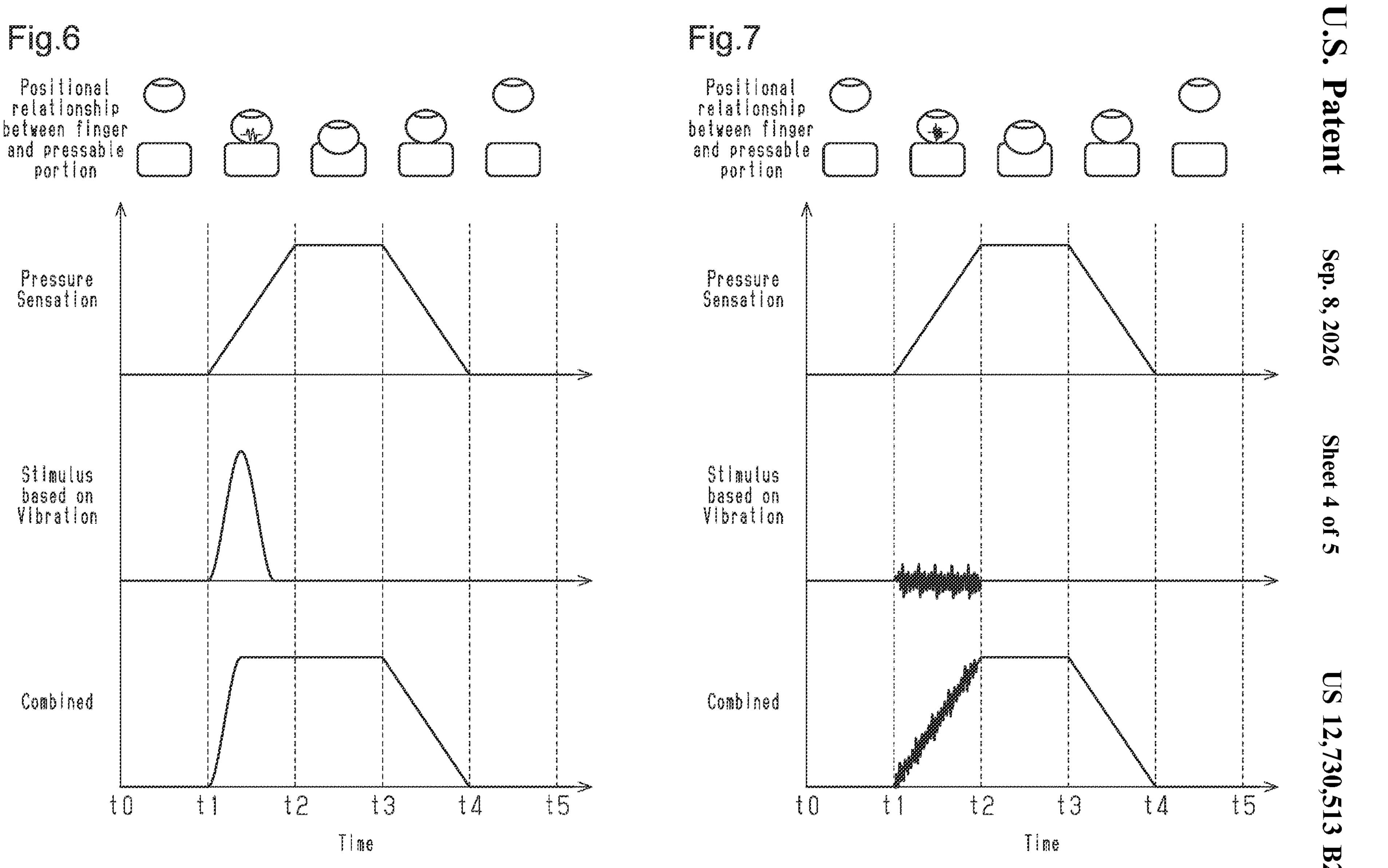
FIG. 6 is a timing diagram of tactile feedback based on a first tactile sensation information set.
FIG. 7 is a timing diagram of tactile feedback based on a second tactile sensation information set.

A case in which the first tactile sensation information set is set will be described with reference to FIG. 6. In this case, immediately after the point in time t1, at which the finger A contacts the pressable portion 32 from a state of being separated, the vibration actuator 22 vibrates intensely for a moment. Accordingly, the slope of the rise in the force change over time that the user feels during the pressing action becomes steeper, as shown in the combined graph in FIG. 6. As a result, the user perceives the tactile sensation of the pressable portion 32 as being harder than it actually is.

A case in which the second tactile sensation information set is set will be described with reference to FIG. 7. In this case, while the finger A is pressed into the pressable portion 32 at a constant speed during the period from t1 to t2, the vibration actuator 22 continues to vibrate finely. Accordingly, as shown in the combined graph in FIG. 7, the force experienced by the user during the pressing action increases while finely fluctuating over time. As a result, when pressing the finger A against the pressable portion 32, the user perceive a granular texture sensation as if particles were rubbing together internally.

Figure 8:
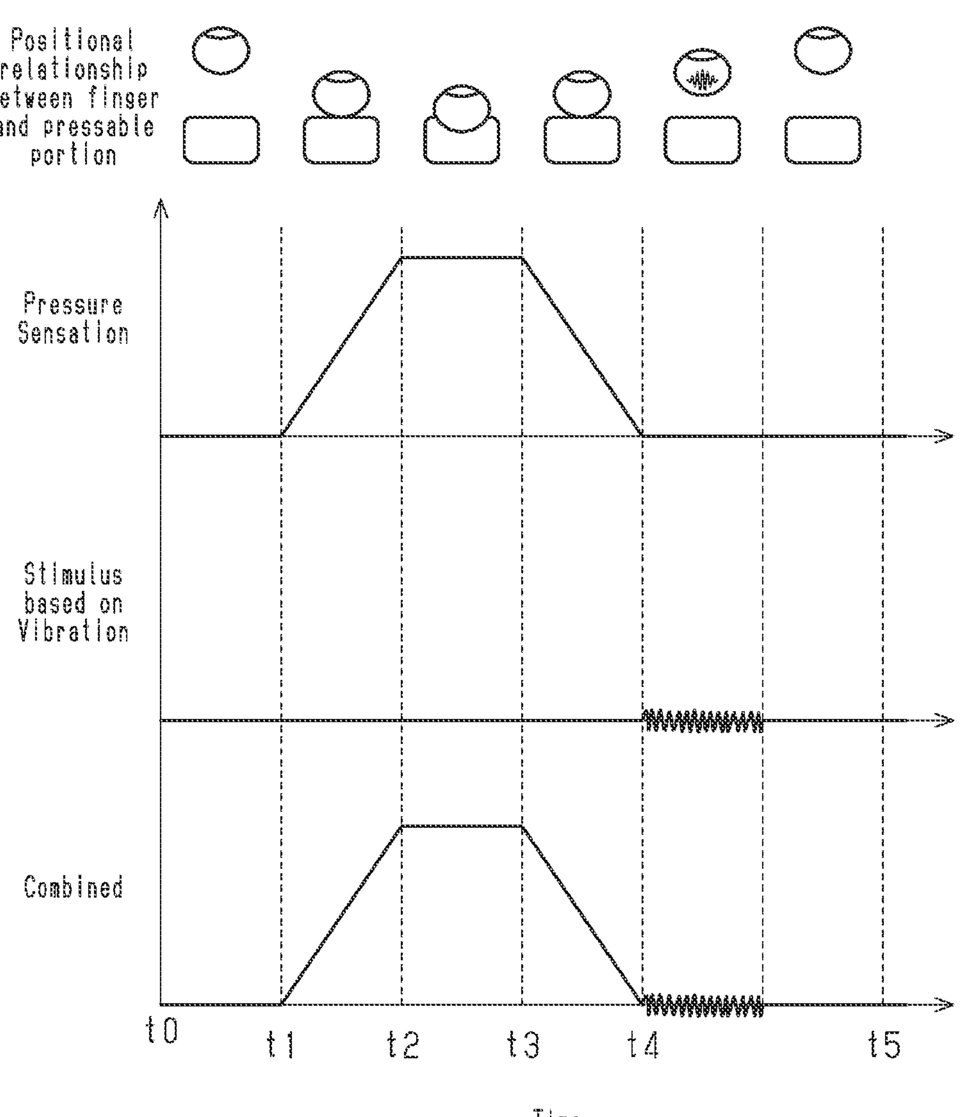
FIG. 8 is a timing diagram of tactile feedback based on a third tactile sensation information set or a fourth tactile sensation information set.

A case in which the third tactile sensation information set and the fourth tactile sensation information set are set will be described with reference to FIG. 8. In this case, immediately after the point in time t4, at which the finger A separates from the pressable portion 32 from a state of being in contact, the vibration actuator 22 vibrates finely. Accordingly, the finger A receives the stimulus from the vibration actuator 22 after the finger A is separated from the pressable portion 32. In this case, the user feels as if the finger A were still slightly in contact with the pressable portion 32 even after the finger A is separated from the pressable portion 32. As a result, when releasing the finger A from the pressable portion 32, the user perceives a sticky sensation of moist human skin or a sticky sensation like that of the sticky side of adhesive tape.

The present embodiment has the following advantages.

(1) The tactile feedback apparatus 10 includes the pressable portion 32, on which a pressing action is performed by the finger A, the detection unit 33, which detects an external force acting on the pressable portion 32, the vibration actuator 22, which applies vibration to the finger A, the storage unit 40, which stores waveform information for driving the vibration actuator 22 so as to provide the finger A with a specific tactile sensation, and the control unit 50, which causes the vibration actuator 22 to vibrate based on the waveform information at a specific point in time in the pressing action. The specific point in time is based on the external force detected by the detection unit 33.

With the above-described configuration, a stimulus of vibration of the vibration actuator 22 is applied to the finger A at the specific point in time in the pressing action of pressing the pressable portion 32. This provides the user, through the finger A, with a tactile sensation that cannot be reproduced in the related art.

(2) The vibration actuator 22 is capable of moving in accordance with the finger A that is performing a pressing action.

With the above-described configuration, the stimulus of vibration of the vibration actuator 22 is reliably applied to the finger A at various points in time in the pressing action, including the point in time at which the finger A is separated from the pressable portion 32. In addition, compared to a configuration in which the vibration actuator 22 is provided in the pressable portion 32 and vibration of the vibration actuator 22 is transmitted to the finger A via the pressable portion 32, the vibration of the vibration actuator 22 is efficiently transmitted to the finger A without being attenuated by the pressable portion 32.

(3) The vibration actuator 22 is attached to the finger A.

The above-described configuration makes the advantage of item (2) more remarkable. Further, the above-described configuration allows the vibration actuator 22 and the finger A to be brought into close contact with each other. Thus, even if the vibration of the vibration actuator 22 is relatively weak, the vibration is transmitted to the finger A. This widens the range of the tactile sensations that can be provided based on vibrations of the vibration actuator 22.

(4) The flexible sheet-shaped vibration actuator 22 is used.

With the above-described configuration, the pressure sensation when the pressable portion 32 performs a pressing action is transmitted to the finger A without being attenuated by the vibration actuator 22.

(5) The control unit 50 causes the vibration actuator 22 to vibrate during a period in which the external force acting on the pressable portion 32 is increasing.

The above-described configuration provides the user with a tactile sensation that feels harder than the actual tactile sensation of the pressable portion 32, or provides the user with a granular texture sensation that is distinct from the actual tactile sensation of the pressable portion 32.

(6) The vibration actuator 22 is caused to vibrate after the finger A is separated from the pressable portion 32 after being in contact with the pressable portion 32.

The above-described configuration provides the user with a sticky sensation, which is not present in the actual tactile sensation of the pressable portion 32. This advantageous is prominent when the vibration actuator 22 is caused to vibrate immediately after the finger A is separated from the pressable portion 32 after being in contact with the pressable portion 32.

(7) The control unit 50 includes the tactile sensation setting unit, which adjusts the vibration of the vibration actuator 22 based on the waveform information.

The above-described configuration provides the user with a tactile sensation that is close to an intended tactile sensation.

The above-described embodiment may be modified as follows. The above-described embodiment and the following modifications can be combined as long as the combined modifications remain technically consistent with each other.

The pressing portion, which performs the pressing action of pressing the pressable portion 32, is not limited to the finger A of a human body, but may be another portion of the human body such as a palm or the sole of a foot. In addition, the tactile feedback apparatus 10 may be configured such that the pressable portion 32 is pressed using a pressing member such as a stylus. In this case, it is preferable that a pressing member such as a stylus serve as the pressing portion, and the vibration actuator 22 be disposed at a portion of the pressing member with which a human body is in contact.

The vibration actuator 22 may be disposed in the pressing device 30. For example, the vibration actuator 22 may be disposed on the outer surface of the pressable portion 32. Further, the vibration actuator 22 may be disposed between the base 31 and the pressable portion 32, and the vibration of the vibration actuator 22 may be transmitted to the pressing portion through the pressable portion 32.

The tactile sensation information stored in the storage unit 40 is not limited to the above-described first to fourth tactile sensation information sets. Any one to three of the first to fourth tactile sensation information sets may be omitted, or tactile sensation information sets other than the first to fourth tactile sensation information may be used.

The detection unit 33 and the determining unit 51 are not limited to the configuration capable of determining changes over time of the external force acting on the pressable portion 32 in a pressing action. For example, the determining unit 51 may be configured to determine only whether the pressing portion is in contact with the pressable portion 32.

An example of an algorithm in this case will be described below. First, the detection values of the detection unit 33 are discretely sampled, and an average value of the most recent several samples is obtained. At this time, noise is removed by a low-pass filter or the like as necessary. Next, if the obtained average value is greater than or equal to a preset threshold value, it is determined that the pressing portion is in contact with the pressable portion 32. If the obtained average value is less than the threshold value, it is determined that the pressing portion is not in contact with the pressable portion 32. While the tactile feedback apparatus 10 is in a tactile feedback state, the above-described process is repeatedly executed.

The detection unit 33 may be configured to detect the position of the pressing portion with respect to the pressable portion 32. As the detection unit 33 in this case, for example, a conventional motion capture device of an optical type, a mechanical type, a magnetic type, or the like may be used. In this case, the determining unit 51 determines whether the pressing portion is in contact with the pressable portion 32 based on the detection result of the detection unit 33, for example.

When the detection unit 33 having the above-described configuration is employed, it is also possible to employ a configuration in which the timing at which the pressing portion comes into contact with the pressable portion 32 is predicted from a detected movement of the pressing portion, and the vibration actuator 22 is caused to vibrate at the predicted timing. In this case, since the process for causing the vibration actuator 22 to vibrate can be started before the pressing portion actually comes into contact with the pressable portion 32, the responsiveness is improved. A detection unit 33 that detects the external force acting on the pressable portion 32 and a detection unit 33 that detects the position of the pressing portion with respect to the pressable portion 32 may be combined. The position of the pressing portion to be detected may be categorized into the above-described four stages or a more finely divided multitude of stages. The position to be detected includes not only a two-dimensional position on the surface of the pressable portion 32, but also a three-dimensional position such as a position not in contact with the pressable portion 32 or a position in contact with the pressable portion 32.

The detection unit 33 is not limited to being provided in the pressing device 30, but may be configured as a component separate from the pressing device 30. For example, the detection unit 33 may be configured to be disposed in a portion in contact with a human body, such as the finger A, a palm, or the sole of a foot. In other words, both the detection unit 33 and the vibration actuator 22 may be worn by the user. In this case, the wearable device 20 is prepared in which a band-shaped base 21, a pressure sensor serving as the detection unit 33, and the vibration actuator 22 are stacked from the outer side toward the inner side, that is, in order from the side closer to the pressable portion 32. The user performs a pressing action of pressing the pressable portion 32 so as to hold the pressure sensor between the finger A and the pressable portion 32 using the finger A, to which the wearable device 20 is attached. At this time, the pressure sensor detects the pressure based on a repulsive force from the pressable portion 32, that is, the external force acting between the finger A and the pressable portion 32.

In this configuration, similar to the above-described embodiment, it is possible to provide a stimulus to the finger A at specific points in time during the pressing action based on the detection results of the pressure sensor as the detection unit 33. Therefore, it is possible to provide tactile sensations that have not been reproduced conventionally. In this case, the object on which the pressing action is performed is not limited to the pressable portion 32 provided in the pressing device 30, but may be any object, for example, a human skin or a skin of an animal. In a case in which an object such as human skin is the object on which a pressing action is performed, the pressing device 30 including the pressable portion 32 may be omitted.

The wearable device 20 may be configured such that the band-shaped base 21, the vibration actuator 22, and the pressure sensor serving as the detection unit 33 are sequentially stacked from the outer side toward the inner side. That is, a configuration may be employed in which the vibration of vibration actuator 22 is transmitted to the user via a pressure sensor. In this case, in order to provide a tactile sensation to the user via the pressure sensor, the vibration actuator 22 may be caused to vibrate based on a vibration waveform in which attenuation of the vibration by the pressure sensor or the like is taken into consideration.

The detection unit 33 may be configured as a separate body from the wearable device 20. For example, a sheet-shaped pressure sensor may be used as the detection unit 33. Then, in a state in which the pressure sensor is disposed on the object on which a pressing action is performed, the pressing action is performed on the object so as to sandwich the pressure sensor with the object and the finger A, to which the wearable device 20 is attached. In this case also, the external force acting between the finger A and the object can be detected.

A correction unit may be provided that corrects waveform information for causing the vibration actuator 22 to vibrate in accordance with the manner in which a pressing action is performed. For example, in a pressing action, a strong reaction force is generated in a case of relatively strong pressing compared to a case of relatively weak pressing, and thus a stronger tactile feedback is required. Therefore, the correction unit is configured to increase the intensity of the provided tactile sensation as the pressing force in the pressing action increases. Also, in a pressing action, a strong reaction force is generated in a case of relatively quick pressing compared to a case of relatively slow pressing, and thus a stronger tactile feedback is required. Therefore, the correction unit is configured to increase the intensity of the provided tactile sensation as the pressing speed in the pressing action increases.

The parameters adjusted for adjusting the vibration of the vibration actuator 22 are not limited to the intensity of the tactile sensation, the delay time, and the waveform information. Further, the function of adjusting the vibration of the vibration actuator 22 may be omitted.

The pressable portion 32 may be made of a hard material having no elasticity.

The vibration actuator 22 is not limited to a DEA, but may be a typical vibration actuator used in a tactile feedback apparatus. Examples of typical vibration actuators include other types of electroactive polymer actuators (EPA) such as an ionic polymer metal composite (IPMC), an eccentric motor, a linear resonant actuator, a voice coil actuator, and a piezoelectric actuator.

The invention claimed is:

1. A tactile feedback apparatus, comprising:

a pressable portion on which a pressing action is performed by a pressing portion;

a detection unit that detects an external force acting on the pressable portion or detects a position of the pressing portion with respect to the pressable portion;

a vibration actuator that applies vibration to the pressing portion;

a storage unit that stores waveform information for driving the vibration actuator so as to provide the pressing portion with a specific tactile sensation; and a control unit that causes the vibration actuator to vibrate based on the waveform information at a specific point in time in the pressing action, the specific point in time being based on the external force or the position detected by the detection unit, wherein the vibration actuator moves in accordance with the pressing portion that is performing the pressing action.

2. The tactile feedback apparatus according to claim 1, wherein the pressing portion is a part of a human body, and the vibration actuator is attached to the pressing portion.

3. A tactile feedback apparatus, comprising:

a pressable portion on which a pressing action is performed by a pressing portion;

a detection unit that detects an external force acting on the pressable portion or detects a position of the pressing portion with respect to the pressable portion;

a vibration actuator that applies vibration to the pressing portion;

a storage unit that stores waveform information for driving the vibration actuator so as to provide the pressing portion with a specific tactile sensation; and a control unit that causes the vibration actuator to vibrate based on the waveform information at a specific point in time in the pressing action wherein the specific point in time is determined based on the external force or the position detected by the detection unit and corresponding to a predicted timing or one of a period in which the external force acting on the pressable portion is increasing or a fixed period immediately after the external force acting on the pressable portion disappears, the predicted timing being a timing at which the pressing portion is predicted, using the detected position, to come into contact with the pressable portion.

4. The tactile feedback apparatus according to claim 3, wherein the control unit causes the vibration actuator to vibrate during a period in which the external force acting on the pressable portion is increasing.

5. The tactile feedback apparatus according to claim 3, wherein the control unit causes the vibration actuator to vibrate during a period obtained by combining a period during which the external force acting on the pressable portion from the pressing portion is decreasing and a fixed period from a point in time at which the pressing portion is separated from the pressable portion.

6. The tactile feedback apparatus according to claim 3, wherein the control unit includes a tactile sensation setting unit that adjusts vibration of the vibration actuator based on the waveform information.

7. The tactile feedback apparatus according to claim 3, wherein the waveform information is waveform information for driving the vibration actuator so as to provide the pressing portion with a tactile sensation simulating human skin.

8. The tactile feedback apparatus according to claim 3, wherein the detection unit is attached to the pressing portion and detects an external force acting on the pressable portion on which a pressing action is performed by the pressing portion.

9. The tactile feedback apparatus according to claim 3, wherein the vibration actuator is a flexible sheet-shaped dielectric elastomer actuator (DEA) comprising a multilayer structure with dielectric layers, positive electrode layers, and negative electrode layers, the dielectric layers being configured to deform in response to an applied voltage to generate the vibration.

10. The tactile feedback apparatus according to claim 9, wherein the dielectric layers of the DEA includes at least one of:

a crosslinked polyrotaxane;

a silicone elastomer;

an acrylic elastomer; and an urethane elastomer, and wherein the dielectric layers of the DEA have a thickness of 20 to 200 μm.

11. The tactile feedback apparatus according to claim 9, wherein the vibration actuator is disposed on a wearable device attachable to the pressing portion, the wearable device comprising a band-shaped base made of a soft material configured to curve and conform to the pressing portion.

12. The tactile feedback apparatus according to claim 11, wherein the soft material of the band-shaped base includes at least one of an elastomer or a stretch fabric, and the band-shaped base includes a holding portion configured to secure the wearable device to the pressing portion.

13. The tactile feedback apparatus according to claim 3, further comprising a display unit configured to display a settings screen, the settings screen including an adjustment area for modifying the waveform information, wherein the adjustment area includes at least one of:

a slider for adjusting an intensity of the tactile sensation;

a time adjustment section for modifying a delay time of the vibration; and a waveform adjustment section for changing a frequency of the waveform information.

14. The tactile feedback apparatus according to claim 13, wherein the settings screen further includes a stage showing area indicating a current stage of the pressing action, the current stage being one of a state before pressing, a state of increasing external force, a state of constant external force, a state of decreasing external force, or a state after separation from the pressable portion.

15. The tactile feedback apparatus according to claim 3, wherein the detection unit is a pressure sensor disposed on a wearable device attachable to the pressing portion, the pressure sensor being configured to detect the external force acting between the pressing portion and the pressable portion.

16. The tactile feedback apparatus according to claim 15, wherein the wearable device includes a band-shaped base, the pressure sensor, and the vibration actuator stacked in order from an outer side to an inner side, such that the pressure sensor is positioned between the pressing portion and the pressable portion during the pressing action.

17. The tactile feedback apparatus according to claim 3, further comprising a correction unit configured to adjust the waveform information based on at least one of a pressing force or a pressing speed of the pressing action, wherein the correction unit increases an intensity of the tactile sensation as the pressing force or the pressing speed increases.

18. The tactile feedback apparatus according to claim 3, wherein the pressing portion is a stylus configured to perform the pressing action, and the vibration actuator is disposed on a portion of the stylus configured to contact a human body.

19. A tactile feedback apparatus, comprising:

a pressable portion on which a pressing action is performed by a pressing portion;

a detection unit that detects an external force acting on the pressable portion or detects a position of the pressing portion with respect to the pressable portion;

a vibration actuator that applies vibration to the pressing portion;

a storage unit that stores waveform information for driving the vibration actuator so as to provide the pressing portion with a specific tactile sensation; and a control unit that causes the vibration actuator to vibrate based on the waveform information at a specific point in time in the pressing action, the specific point in time being based on the external force or the position detected by the detection unit wherein the waveform information includes at least one of:

a rectangular wave configured to simulate a hard tactile sensation; and a combination of multiple sine waves configured to simulate a granular texture sensation or a sticky sensation.

* * * * *